United States Patent
Pearson (10) Patent No.: US 6,970,528 B2
(45) Date of Patent: Nov. 29, 2005

(54) METHOD AND APPARATUS TO MEASURE JITTER

(75) Inventor: Chris C. Pearson, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 859 days.

(21) Appl. No.: 09/974,697

(22) Filed: Oct. 10, 2001

(65) Prior Publication Data

US 2002/0075951 A1 Jun. 20, 2002

Related U.S. Application Data (60) Provisional application No. 60/240,830, filed on Oct. 17, 2000.

(51) Int. Cl.[7] ............................................. H04L 25/08
(52) U.S. Cl. ..................................................... 375/371
(58) Field of Search .................................. 375/371, 226; 702/69

(56) References Cited

U.S. PATENT DOCUMENTS

| | | | | |
|---|---|---|---|---|
| 5,748,672 A | * | 5/1998 | Smith et al. | ................. 375/226 |
| 6,687,629 B1 | * | 2/2004 | Yamaguchi et al. | ........... 702/69 |
| 6,795,496 B1 | * | 9/2004 | Soma et al. | ................. 375/226 |

* cited by examiner

*Primary Examiner*—Chieh M. Fan
*Assistant Examiner*—Kevin Kim (57) ABSTRACT

A method of determining jitter is provided by providing a sample, performing an unwrap of the data and then performing a Fast Fourier Transform (FFT) of the data. The fundamental is filtered out and an inverst FFT is determined. The sparkle code is taken out and the phase is adjusted to a known phase. The noise difference at both the high and low rtates by angles is determined. The jitter by angle is calculated using the high slew variance and low slew variance. The average jitter is then calculated.

4 Claims, 6 Drawing Sheets

NOTICE: SPARKLE CODES CAN BE SEEN ON THE UNWRAP GRAPH. THEY ARE NEXT TO IMPOSSIBLE TO SEE ON THE CAPTURED DATA GRAPH(TSAMPLE)

FIG. 5

FIG. 8a — THIS GRAPH HAS JITTER AS CAN BE SEEN BY THE FACT THAT THE CODE ERROR AT THE HIGH SLEW RATES IS GREATER THAN THAT AT THE LOW SLEW RATES. JITTER CAN BE CALCULATED FROM THE HIGH AND LOW SLEW RATE CODE ERRORS AS WILL BE SHOWN IN THE FOLLOWING STEPS

FIG. 8b — THIS GRAPH HAS JITTER AS CAN BE SEEN BY THE FACT THAT THE CODE ERROR AT THE HIGH SLEW RATES IS GREATER THAN THAT AT THE LOW SLEW RATES. JITTER CAN BE CALCULATED FROM THE HIGH AND LOW SLEW RATE CODE ERRORS AS WILL BE SHOWN IN THE STEPS 206-211 OF FIG. 2

METHOD AND APPARATUS TO MEASURE JITTER

This application claims priority under 35 USC § 119(e)(1) of provisional application Ser. No. 60/240,830, filed Oct. 17, 2000.

BACKGROUND OF INVENTION

The growing use of data converters has created a demand for more accurate and more precise methods for measuring jitter. Jitter refers to the presence of abrupt, spurious variations in the amplitude or frequency of a periodic signal. Jitter is a component of signa-to-noise ratio (SNR), which is an important parameter in assessing the performance of a data converter. Jitter causes deviations in the sampling time, which, in turn causes deviations in the value of the signal sample. Jitter becomes a major factor in the SNR at relatively high input frequencies, for example, the frequencies at which communications analog-to-digital converters (ADCs) operate, because even a sall deviation in the sampling time may result in a large deviation in the value of the signal sample. As the demand for intermediate frequency sampling increases, ADC manufacturers are faced with the task of measuring SNR at very high input frequencies. The SNR at high input frequencies may be measured using a test system with very low jitter. Even stat-of-the-art systems cannot meet the low jitter requirement. Alternatively, the SNR may be measured using test systems with jitter by measuring the jitter of the system and then calibrating out the jitter. Known methods and systems of measuring jitter, however, have not been completely satisfactory in terms of accuracy, presision, and speed. The overall jitter may be due to internal factors inside the data converter such as the aperature jitter of a sample and hold circuit, or to external factors such as the jitter of a clock source or the phase noise of an input wave generator. The present application relates to means to measure noise caused by clock, input signal and aperture jitter.

Clock jitter has previously been measured using one of several techniques.

A first technique is to observe the spectral spreading or smearing around the spectral components of the clock. This technique is mainly used for circuits which must avoid generating energy in unwanted frequency bands. An example would be a cellular phone frequency synthesizer, which must produce a very pure sine wave which does not fail FCC compliance tests. This technique is unable to relate spectral spreading to time jitter, in RMS seconds.

A second commonly used technique is to slowly sweep the strobe signal of a strobed comparator across the rising or falling edge of the clock, capturing thousands of 1/0 outputs from the comparator. On a rising edge, the 1/0 sequence would start out with all 0's and then transition to all 1's. The percentage of 1's and 0's at each sweep position are recorded into a mathematical array. Then the derivative of the array provides the jitter histogram, from which the standard deviation of the jitter can be measured. This technique is very accurate, but requires a long test time because of the thousands of 1's and 0's that must be collected.

A third commonly used approach is to directly digitize the time intervals of the clock using a time digitizer. This type of circuit generally uses a time stretcher, which charges a capacitor with a fixed DC current for the time period to be measured and then discharges the capacitor with a small fraction of the DC current. The time required to discharge the capacitor is much easier to measure than the original time interval. Achieving one-shot measurements in the 20 ps range using this technique is very difficult, however. It is also very expensive.

A fourth technique involves digitization of multiple samples of the same point on a steeply rising edge with a constant slope (i.e., a very fast ramp). In this case, the voltage noise is related to the jitter by a very simple dv/dt relationship. This technique suffers from two problems. First the slope of the rising edge must be calibrated accurately, which is difficult to do. Second, there is no way to extract the voltage noise inherent to the digitization process from the jitter noise, since they both appear as voltage noise.

In recently filed Texas Instruments Inc. applications the signal to noise measurement and jitter measurement has been done using two test setups and two data sets. In one application of Burns et al. entitled "Method and Apparatus to Measure Jitter" filed Jul. 28, 1998, Ser. No. 09/124,199 an innovative system and method for measuring jitter of a high speed Analog to Digital (A/D) converter. This Burns et al. application is incorporated herein by reference. Aperture jitter in a Sample and Hold circuit (S/H) or in an A/D converter introduces noise into the sampled signal. The noise is more extreme in areas of the input waveform that have a steep positive or negative slope. The preferred embodiment allows an easy and inexpensive way to measure aperture jitter in S/H and A/D circuits. The technique can also be adapted for measuring edge jitter in digital clock signals or in analog sine wave signals. This application uses two data sets with one slower than the other. A first sine wave of a first amplitude and frequency and a second sine wave of a second amplitude and frequency and connected to receive evenly spaced samples and a provessor to compute signal amplitude and noise of the first and second wave and process that determine jitter. In accordance with another embodiment Ser. No. 60/171,260 (TI29000) filed Dec. 15, 1999 of Kuyel entitled "Method and System for Measuring Jitter", jitter is determined by the step of first estimating the overal jitter by using the analog-to-digital itself using Dual Histograms of an Undersampled Sinusoid (DHUS) method. The aperature jitter of the analog-to-digital converter is estimated by time differential sampling method. The signal to noise ratio (SNR) is computed using conventional Fast Fourier Transform (FFT) method. The noise contribution due to overall jitter is subtracted out and the noise contribution due to analog-to-digital's aperature jitter is added in to get the signal to noise ratio. The system includes a data converter that measures a signal to generate a first measurement set and a second measurement set, which are used to compute overall jitter. The data converter generates the first measurement set and the second measurement set by measuring the signal. The overall jitter is computed using the measurement sets. According to one embodiment, a system for measuring internal jitter is disclosed that includes a splitter that splits a signal into an input signal and a clock signal. The data converter measures the input signal to generate a first data set and a second data set, which are used to compute the internal jitter of the data converter. According to one embodiment, a method for measuring internal jitter is disclosed. A signal is split into an input signal and a clock signal. The data converter measures the input signal to generate the first data set and the second data set. The internal jitter is computed using the first data set and the second data set. The external jitter is computed from the overall and internal jitter. The signal-to-noise ratio of the data converter is computed from the external jitter. This Kuyel application is incorporated herein by reference.

It is desirable to provide a measurement of jitter using one test set up and one data base and better repeatability on jitter measurements and possible test time improvements depending on the test platform being used.

SUMMARY OF INVENTION

In accordance with one embodiment of the present invention for a single sine wave the signal to noise data set to calculate jitter by performing an unwrap of the data, taking a Fast Fourier Transform (FFT), filtering out the fundamental, then taking an inverse FFT and measuring the noise difference at the high and low slew rates.

DESCRIPTION OF PREFERRED EMBODIMENT OF THE PRESENT INVENTION

Figure 1:
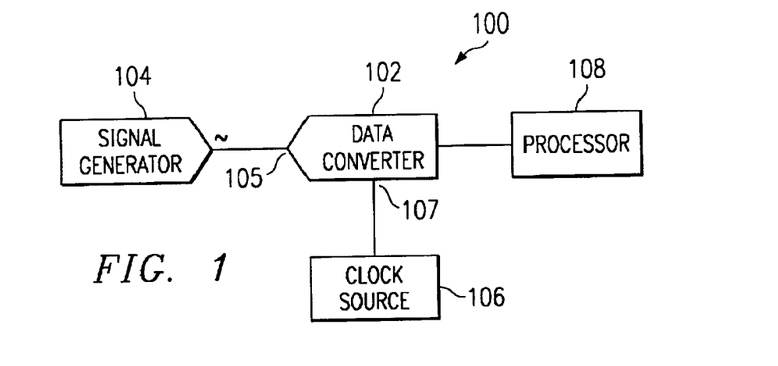
FIG. 1 illustrates a test set up for for testing integrated circuits for jitter that may be used according to one embodiment of the present invention.

Referring to FIG. 1 there is illustrated a block diagram of system for the measurement of jitter according to the present invention. The system 100 comprises an integrated circuit under test such as a data coverter 102, a signal generator 104, a clock source 106 and a processor 108, all of which may be coupled to the data converter 102. The data converter may be an analog-to-digital converter (ADC). The signal generator may be, for example, a low phase noise sine wave generator. The signal generator 104 may be operable to output to the data converter 102 a signal that has maximum slew rate points, points of greatest slope, and minimum slew rate points, points of zero slope. The clock source 106 may be synchronized with the signal generator 104, for example, it may be phased locked with the signal generator 104. The signal from the signal generator 104 may be sent to the input 105 of the data converter 102, and may be used as the signal to be sampled. The signal from the clock source 106 may be sent to the clock 107 of the data converter 102, and may be used to determine which points of the input signal are to be sampled. The processor 108 is used to compute the jitter in accordance with the steps in FIG. 2. The system may be an A580 Teradyne tester including a test system signal generator, a test head coupled to the data converter 102, a processor with a computer program as discussed below and monitor.

Figure 2:
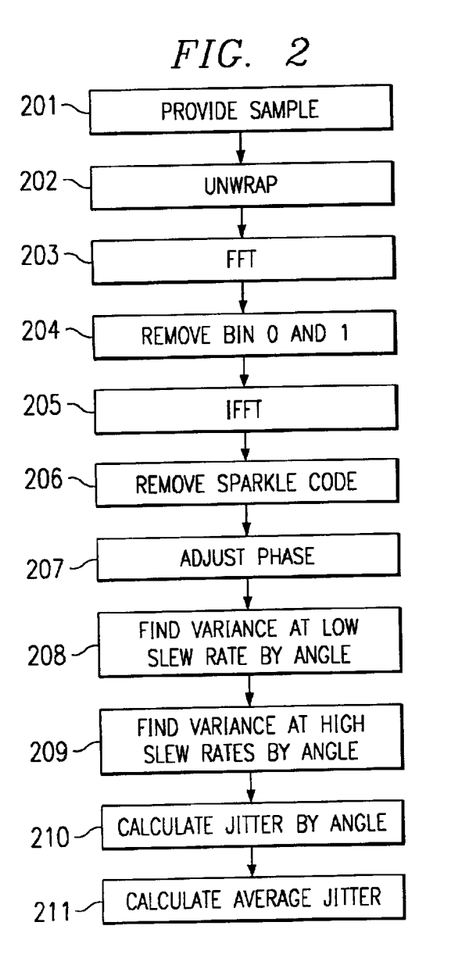
FIG. 2 is a flow diagram of the method according to one embodiment of the prseent invention.

FIG. 2 illustrates the steps in accordance with an embodiment of the present invention to calculate jitter. The first step 201 is to capture a coherent sample. The second step 202 is performing an unwrap of the data. The third step 203 is taking a Fast Fourier Transform. The fourth step 204 is filtering out the fundamental. The next step 205 is taking an IFFT. The next step 206 removing the sparkle code. The next step 207 is adjusting to known phase. The next steps 208 and 209 are measuring the noise difference at the high and low slew rates. The next step is calculating the jitter using the high slew variance and low slew variance.

Figure 3:
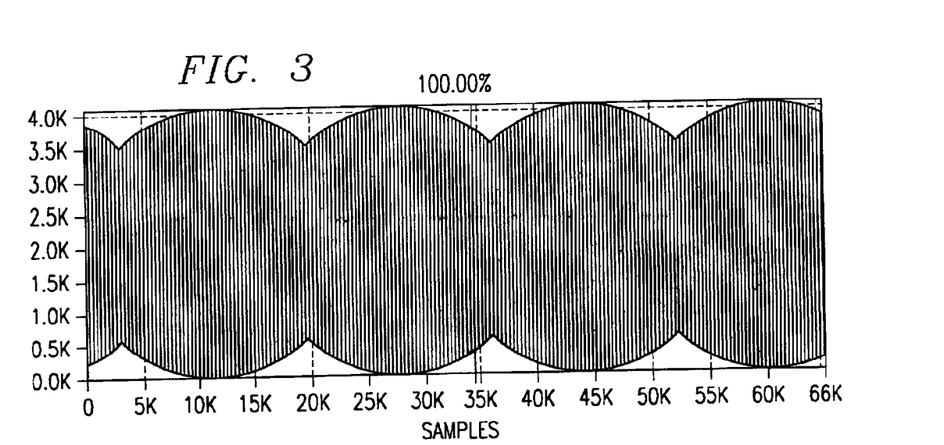
FIG. 3 is a graph of a tsample array-capture data.

In Step 201 a coherent sample is captured to be used in the spectral calculations and the jitter calculations. For this example fin=15744993, fcapture=2031616, M=507903, and N=65536. A graph is illustrated by tsample array in FIG. 3. In FIG. 3 the wave display shows the x-axis in samples This satisfies the following equation with the following criteria: fin is an integer number, M is an odd integer number and N is a power of two.

$$fin/fcap = M/N$$
$$fin = \text{input frequency}$$
$$fcap = \text{capture frequency}$$
$$M = \text{\# of cycles}$$
$$N = \text{\#captured samples}$$

Figure 4A:
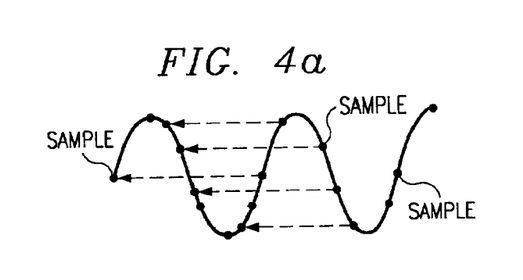
FIG. 4a iluustrates unwrapp and FIG. 4b is a graph of and unwrap array-unwrap of capture data ( tsample)of FIG. 3.
Figure 4B:
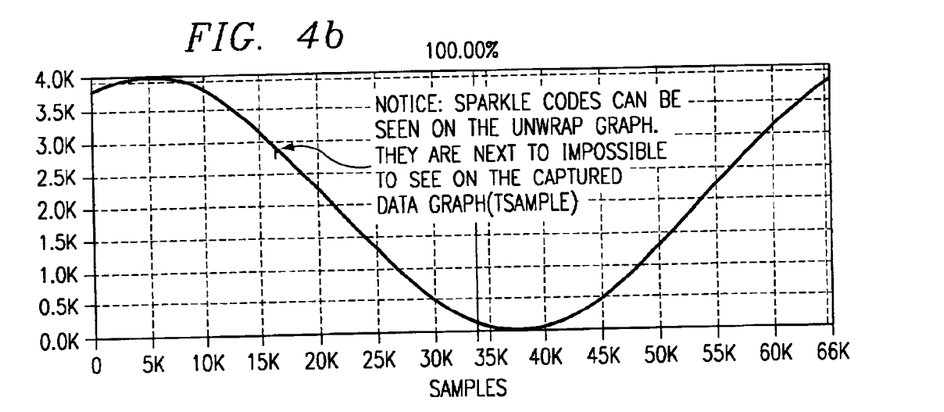

In Step 202, from the array (tsample) captured above the data is unwrapped(also known as interleaving). This rearranges the data from Step 201 to look like a single cycle. The samples from the cycles are effectively moves to plot and define the signle cycle as illustrated in FIG. 4a. The unwrap array is illustrated in the graph of FIG. 4b. This is done with the following C programming looping using the remainder function (%—also know as the modulo function).

```
for(j = 0; j<N; j++)
    {
    k = j*M%N;
    unwrap(k) = tsample(j);
    }
j = loop counter
k = unwrap counter
M = # of cycles
N = # of captured samples
unwrap( ) = the captured data unwrapped into a single sine wave
tsample = captured data
```

Figure 5:
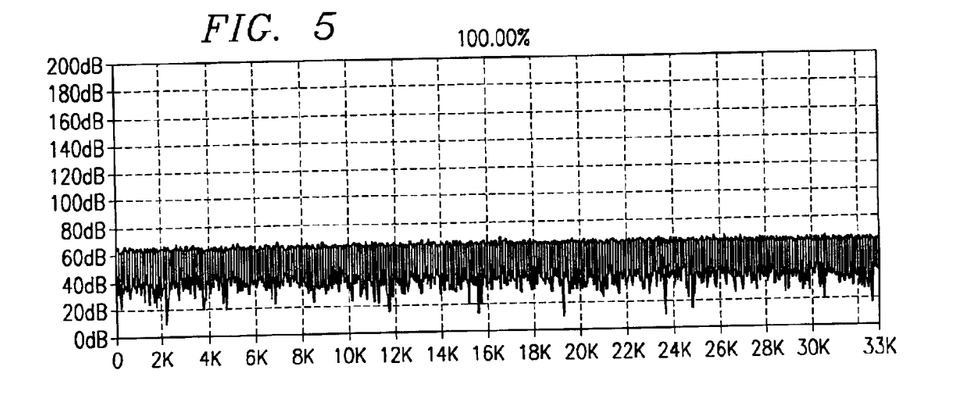
FIG. 5 is a graph of an unwrap FFT.
Figure 6:
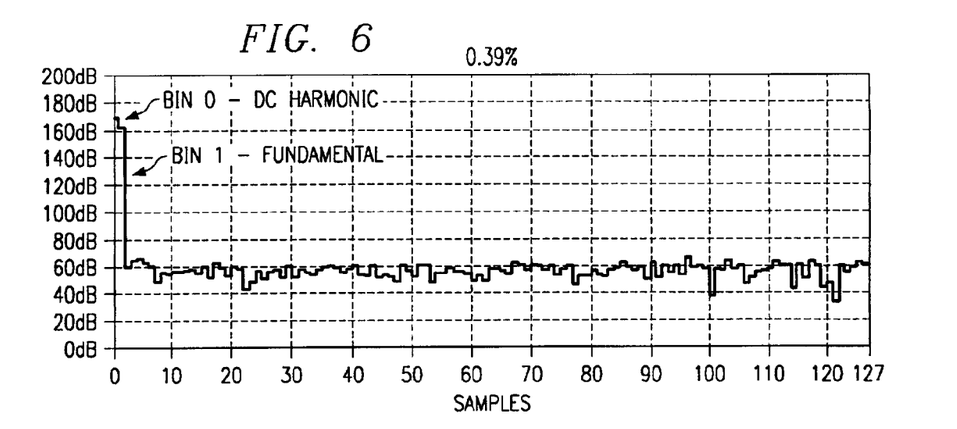
FIG. 6 is a graph of an unwrapped FFT, zoomed in to look at bin 0(harmonic) and bin 1 (fundamental)

In Step 203 the Fast Fourier Transform (FFT) of the unwrap array from graph of FIG. 4b is computed. The unwrap FFT is illustrated by FIG. 5. Since the unwrap array is only one cycle the DC Harmonic is in bin 0, the fundamental is in bin 1, the second harmonic is in bin 2 and so on. FIG. 6 illustrates the unwrapped FFT zoomed in to look at bin 0 (DC harmonic) and bin 1 (fundamental). SNR, Total Harmonic Distrotion (THD), Spurious Free Dynamic Range) SFDR and Effective Number of Bits (ENOB) calculated from the unwrap FFT will give the same numerical results as when calculated from the captured data(tsample) FFT.

The spectral calculations (without jitter computation) are finished in step 203. The remaining steps are done to find the jitter computation from the same dataset as the FFT data. They might not make sense at first but hopefully it will all come together in the end. The first step is to find the fundamental's phase information from the spectral data and store it in a variable. The next step is to store the fundamental information, which contains the Code peak to peak information of the input sine wave.

Figure 7:
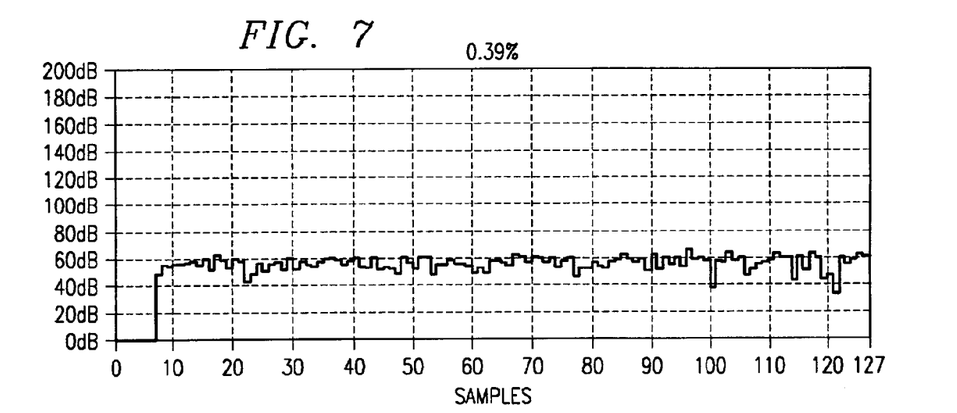
FIG. 7 is a graph of unwrap FFT with bins 0 and 7 removed.

In Step 204 remove the DC harmonic, the fundamental, plus any other harmonics that you think contribute to integral linearity errors. For this example the DC harmonic, the fundamental and the $2^{nd}$ through $7^{th}$ harmonics(bins 2 through 7) were removed. FIG. 7 illustrates the unwrap fft with bins 0 to 7 removed. Code is not shown for theinverse FFT, because it has some subroutine calls and dsp buffers (basically it didn't make much sense out of the program).

When using the FFT to filter frequencies one has to be careful about frequency bleeding between frequency bins. This technique is not recommended for some applications, however for this application it has shown to be satisfactory.

Figure 8A:
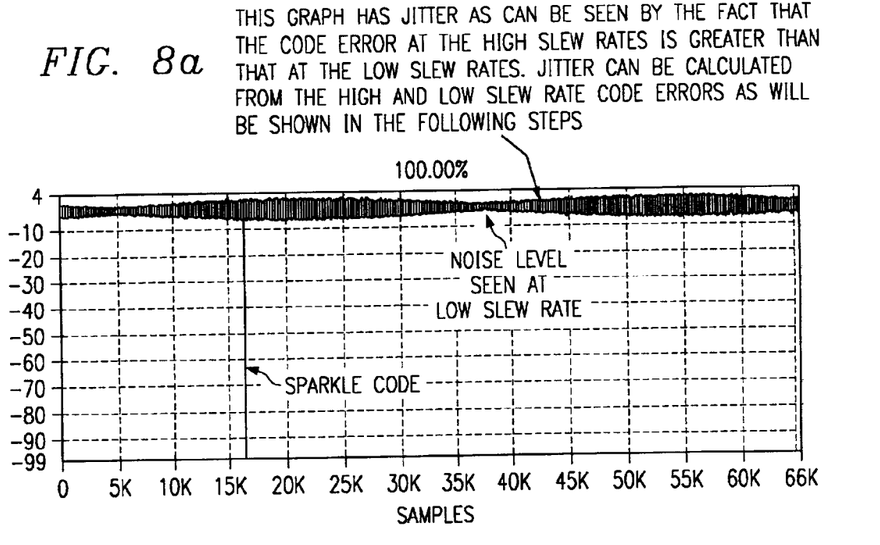
FIG. 8a is of graph error (inverse FFT) and FIG. 8b is a graph of unwrap-same as graph of FIG. 4b.
Figure 8B:
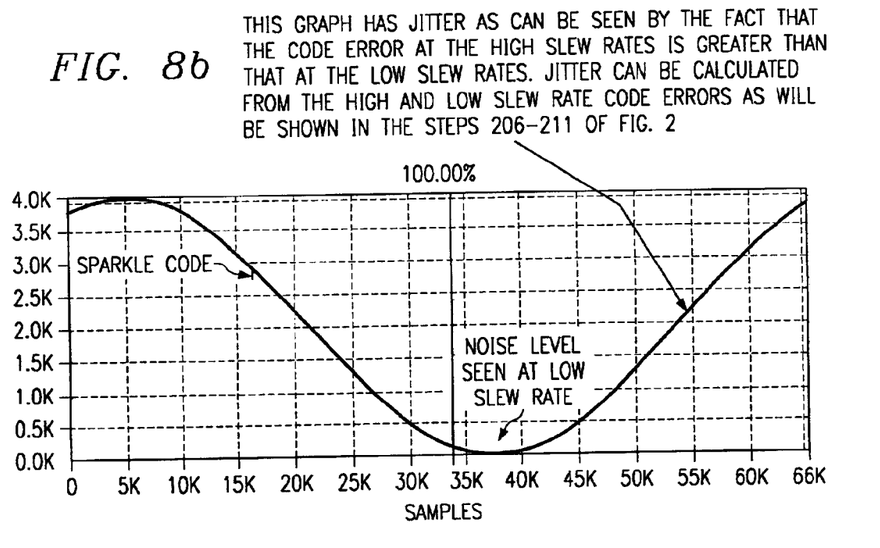

In Step 205 the inverse FFT (IFFT) is taken from the data described in step 204. The inverse FFT should gives the unwrap plot without the fundamental, DC offset, plus whatever other harmonics were removed in step 204. FIG. 8a illustrates the code error (inverse FFT) and FIG. 8b below illustrates the unwrap as in FIG. 4. What this graph shows is the deviation from the ideal, or in other words it shows the noise floor in the time domain. I usually call this plot the 'code error' plot. This plot is a good tool in that it can separate out the noise components seen in the spectral plot. Notice it is easy to pick out that this device had one sparkle code, its noise floor can be seen at the low slew rate points and it fitter sensitivity is seen by the difference in the noise level at the high and low slew rate points.

Figure 9:
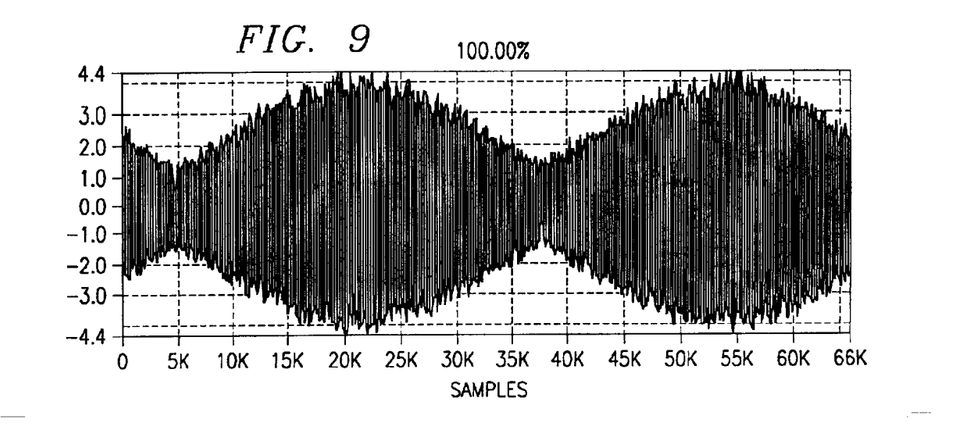
FIG. 9 is a graph of code error with sparkle code removed.

In Step 206 all sparkle codes must be removed since we are only concerned about measuring the jitter. This is subject to the noise level of the device and system as to what level constitutes a sparkle code. For this example we will assume anything greater than 10 codes of error is a sparkle. However, you may run into a situation where smaller sparkles are messing up your measurement. If this is the case a better sparkle code detector will need to be designed. The result of this sparkle detector is seen in FIG. 9 which illustrates the code error with sparkle code removed.

```
sparkle = 0; /* sparkle code counter */
For(j = 0; j<N; j++)
    {
    /* checks if the absolute value(fabs) of the code error is
    greater than 10 */
    if(fabs(code_error(j]) > 10)
        {
        sparkle++; /* counts number of sparkles */
        code_error[j] = 0; /* removes sparkle by
            setting it to 0 */
        }
    }
            j = loop counter
            N = # of captured samples
        sparkle = counts number of sparkles
    code error[] = code error array seen in graph F1
```

Figure 10:
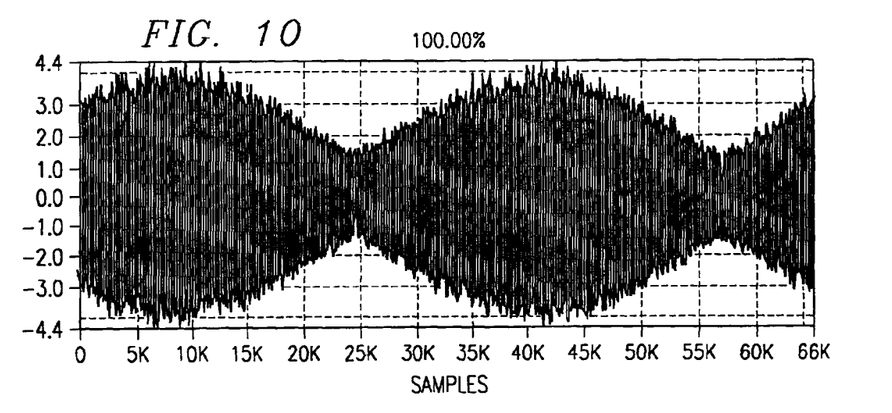
FIG. 10 is a graph of code error with 45 degree phase adjust.

In Step 207 adjust to known phase. FIG. 10 shows a code error plot that shows the noise information at the high and low slew rates only. Remember in the previous steps we have removed, or at least tried to remove the dominant effects due to integral linearity and sparkle codes. With this graph we are able to determine the system jitter. The only problem is that this graph has not been adjusted for the phase found. The goal here is to make a code error graph that starts a pre-determined phase to make all subsequent jitter calculations easier. For this example, the predetermined phase is cosine of 45 degrees.

The code to perform the phase adjust is as follows, comments are included.

/* phase will be a random variable between −pi(180 deg to 360 deg) and +pi(0deg to 180 deg) due to the nature of not being able to control the phase of the VHFCW. PHASE was calculated in the alc_ distortion_ifft function This IF statement adjust the phase variable from (−pi to +pi) to (pi/4 to 9*pi/4). Making the phase range all positive makes the rest of the equations easier to work with */

```
if(phase<M_PI/4)     phase = 2*M_PI + phase;
/*       find 45 deg location points in vector to use in the loops below */
adjust1 = (int) ((double)N/(2*M_PI)*(phase - M_PI/4.0));
adjust2 = (int) (N - adjust1.);
/*       loops to adjust the code error plot vector from a random starting
         phase to a starting phase of cos(45deg) or sin(135deg) */
for(i=0, j=adjust1;i<adjust2; i++, j++)
         code_error_adjust[j]      =code_error[i];
for(i=0, j=adjust2; i<adjust1; i++, j++)
         code_error_adjust[i] = code_error[j];
```

Figure 11:
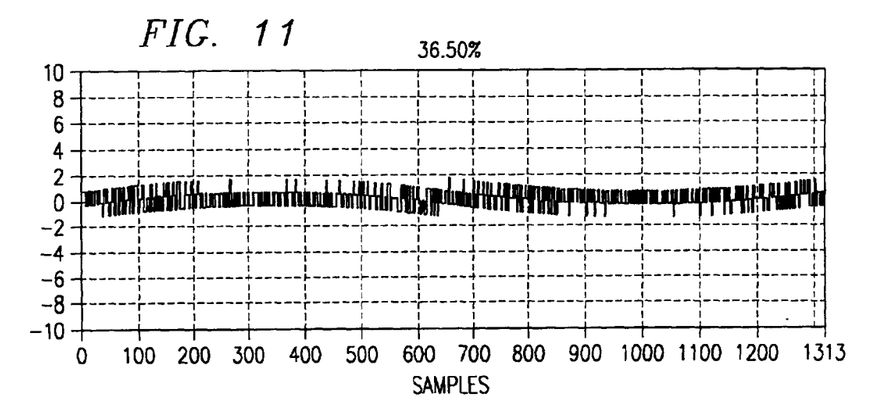
FIG. 11 is a graph of code error at low slew rate.

FIG. 11 illustrates code error with 45 degree phase adjust.

Step 208 finds the variance (standard deviation$^2$) of the code error at the low slew rate. The variance at the low slew rate is assumed to be due only to the noise floor. A graph of the code error at the low slew rate is seen on the next page. This graph and low slew rate variance calculation can be found in the following C code. Comments are left in C code for more explanation.

```
/* ~~~~~~~~~~~~~~ low slew rate code error ~~~~~~~~~~~~~~~~~~~~~~~~~~~~ */
/*       this finds the standard deviation of the code error plot at the low
         slew rate parts(sin90 and sin270) of the sine wave. The assumption here
         is that jitter does not affect the low slew rate part, so all that is seen
         at the low slew rate part of the sine wave is noise.
         Using excel and matlab it was decided to find the noise from the peak of
         the sine wave to the peak of the sine wave - 1 code. the equation below
         describes this and is used to solve for delta_1s
         fund +fund *cos(2*pi*delta_1s/N) = fundamental - 1
```

If your system is really noisy and you are getting bad jitter measurements than solve the above equation for 2 or more codes below the fundamental. The theory is that as the noise level increases jitter becomes less repeatable for this type of measurement. One way to increase repeatablity of the low slew rate standard deviation for a noisy system is to increase the number of samples taken by looking at more codes below the fundamental. Another way is to increase the tsample sample size. I assumed that the low slew rate code error level(noise) of the system was low with respect to the the high slew rate code error(jitter). This assumption did take into account some tester and simulated data from a 12 bit device.

Just as a heads up—21000 high slew rate points, but only 1300 low slew rate points are being used to calculated the jitter. This takes into account the low level noise assumption described above and the reason you could increase the low slew rate points if more noise is inject, just be careful you don't get to high up on the curve where jitter is getting into the low slew rate points.

```
*/
delta is = N/(2*M_PI)*acos(( fund -1.0)/(fund));
code error mean = 0;
code error mean2 = 0;
var_low_slew = 0;
/* finds the mean and mean squared values which calculate variance and std..
these for loops and equations calculate the variance of the code
error at the low slew rate(assume this to have noise only). The sqrt(var)
is equal to the std deviation which is the same as the noise rms.
*/
num_1s =0;
for(i = ((int)(N*3/8)-(int)(delta Is)); i<=((int)(N*3/8)+(int)(delta Is)); i++)
         {
         code_error_1s[num_1s] = code_error_adjust[i];
         num_1s = num_1s +1;
         }
for(i =( (int)(N*7/8)-(int)(delta_Is)); i<=((int)(N*7/8)+(int)(delta_1s)); i++)
         {
         code_error_1s[num_1s] = code_error_adjust[i];
         num_1s=num_1s +1;
         }
for (i = 0; i<num_Is; i++)
         {
         code_error_mean = code_error_mean + code_error_1s[i];
         code_error_mean2 = code_error_mean2 + code_error_1s[i]*code_error_1s[i];
         }
var_low_slew=(code_error_mean2/num_1s)-
         (code_error_mean/num_1s*code_error_mean/num_1s);
```

FIG. 11 illustrates the code error at low slew rate. This graph can be sensitive to INL issues if the converter has really bad INL towards the zero and full-scale regions of the converter. If this is the case then this graph can be divided up into smaller sections to screen out the INL.

Step 209 is to find the high slew rate variance now that the low slew rate variance has been found. From some Matlab modeling data and some data that was taken on the A5xx(HSD50) using the DHUS method on the THS1265 it was found that the higher slew rate variance repeatability was causing more jitter variation than the lower slew rate variance repeatability. To reduce the jitter variation due to the high slew rate more samples are used to determine the high slew rate.

Figure 12A:
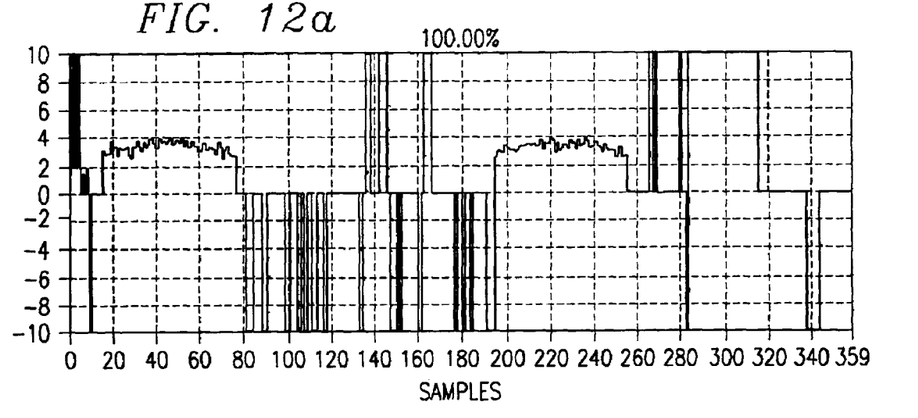
FIG. 12a is a graph of a high slew rate variance.
Figure 12B:
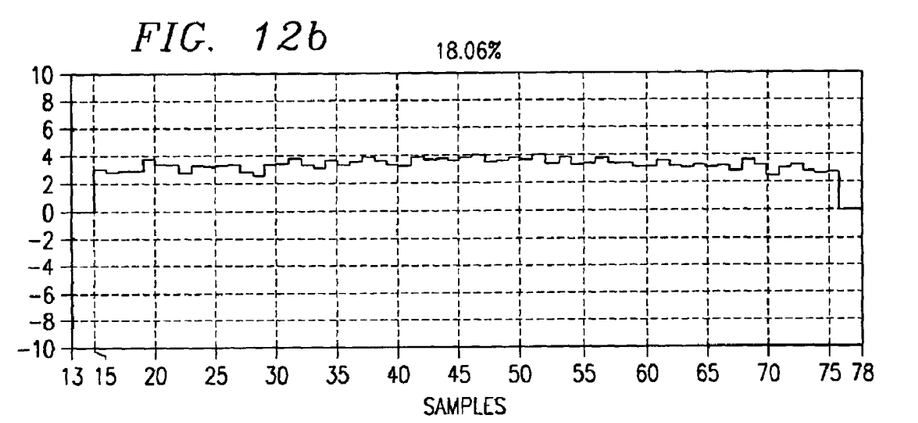
FIG. 12b is a graph of high slew rate variance—zoom in on angles 15 to 75.
Figure 12C:
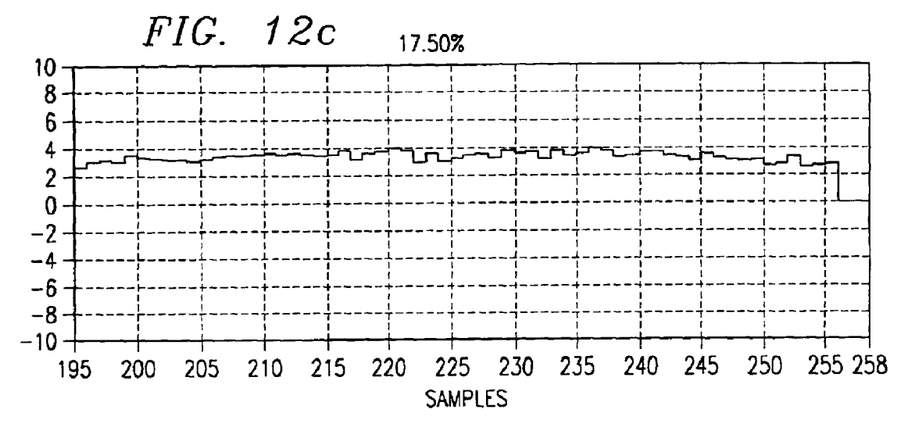
FIG. 12c is a graph of high slew rate variance—zoom in on angles 195 to 255.

To get the most out of the high slew rate information the calculations need to monitor at what phase you are taking the data from. Consequently the variance (standard deviation $^2$) was computed for each angle of the code error plot. The high slew rates are seen at cos 90 deg and cos 270 deg. However, in step(h) the code error plot was adjust so that cos 45 deg was at the 0 position in the code error array. So for this example the high slew rate points are at cos(90 deg–45 deg)[or cos(45)] and cos(270 deg–45 deg) [or cos(225)]. Since I am only concerned with the high slew rate information the angles I am going to monitor are 45 deg+/−30 degs and 225+/−30 degs. The graph of FIG. 12a–12c depicts this. FIG. 12a illustrates the high slew rate variance (only at angles 15–75 and 195–255 show actual data ). FIG. 12b illustrate high slew variance—zoom in on angles 15 to 75. FIG. 12c illustrate high slew rate variance—zoom in on angles 195 to 255. Notice the information not included in the 45 deg+/−30 deg and 225+/−30 deg is just showing noise from what ever was in that array location previously.

$$[FS/2+FS/2*\sin(2*pi*fin*t)]-[FS/2+FS/2*\sin(2*pi*fin*(t+ta))+\text{noise}]=\text{code error}$$

FS=amplitude, fullscale range of data, determined from fundamental fin=input frequency ta=jitter t=time(used to find angles)

noise=noise floor(from low slew rate variance)

code error=jitter+noise floor(from high slew rate variance)

Figure 13:
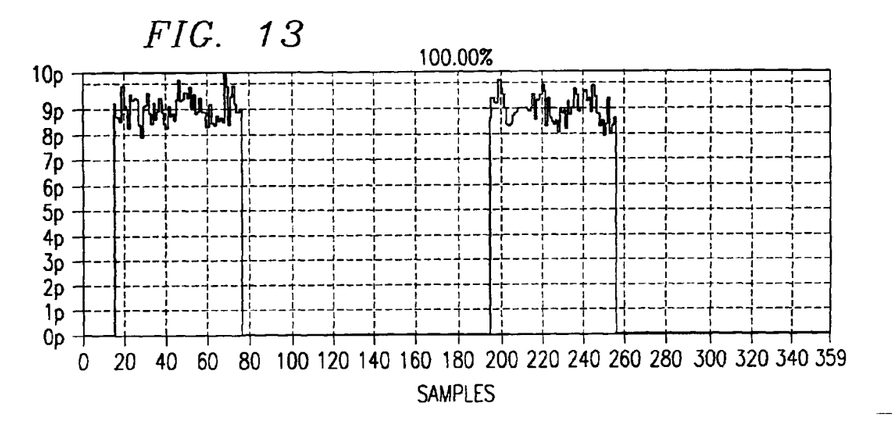
FIG. 13 is a graph of jitter by angle.

Now solve that equation for ta(jitter). Then solve this equation for each angle mentioned above(angles 15–75 and 195–255) and you will get the following graph of FIG. 13 that illustrates the jitter by angle. Solving for ta:

$$ta=\text{asin }[\sin(2*pi*fin*t)-(\text{code error}-\text{noise})/FS/2]/2*pi*fin-t$$

In Step 211 average the jitter for all the angles that jitter is calculated above for. This will be the jitter measurement you can report and use in your SNR, ENOB jitter adjust routine.

The code for Steps 209 (high slew rate), 210 (jitter by angle), and 211 (jitter mean) is shown below, comments were left to hopefully make it less confusing. You may have to reference some variables back in the code in step 1(low slew rate) to make sense of this code below.

```
/* ~~~~~~~~~~~~ low slew rate code error ~~~~~~~~~~~~~~~~~~~~~~~~~ */
/* This routine finds the standard deviation for each angle at 1 degree increments. Remember
   there is a 45deg offset, so when i =0, you are at angle 45 and when i =1 you are angle
   46
   and so on. When i=1 you are looking at the standard deviation of the code error from
   angle 45.5 to angle 46.5. Then when i =2 you are looking at the standard deviation from
   angle 46.5 to angle 47.5. This will continue for all 360 angles of the sine wave. (notice
   cos(135) = sin(45) - some of the equations in here use angle 135 and angle 45, be careful
   to understand if it is in the cosine or sine notation)
   With these code error standard deviations at each angle, a jitter
   measurement is made by subtracting the sum of the squares from the
   low slew rate code error standard deviation figured above.
   This is done be plugging the variables in the following equation:
     jitter_angle[i] = asin(sin(2*M PI*(mid angle+3.0*(float)N/8.0)/(float)N)
-sqrt(code error_std[i]*code error std[i]-std_low slew*std low_slew))
/fund) / (2.0*M PI*(float)fin) - t;
     This equation was derived from this:
          ideal sine wave point - actual sine wave point = delta code
                              or
[FS/2 + FS/2*sin(2*pi*fin*t)] - [FS/2 + FS/2*sin(2*pi*f(t+ta)) + Noise =delta code
             where   FS = full scale range in codes(found from fundamental)
                     pi = 3.1415927. . .
                     fin = input frequency(or N/M*fs)
                     t = time
                     ta = aperture jitter
                     Noise = noise
                     delta code = ideal code location - actual
```

The C code for this is mixed in with another calculation. It is also really long and confusing. So for convience it will be shown in the next section.

*The high slew rate graphs can also be sensitive INL just like the low slew rate graph if the INL is bad enough. This will have to be tackled on a part by part basis. I have not studied the INL limitations of this using Matlab as of yet.

In Step 210 from the high slew rate variance by each angle (Step 209) and the low slew rate variance (Step 208) a jitter calculation can be performed on each angle.

The calculation that needs to be solve to get the jitter calculation is

Using this equation the rms delta code is calculated at each angle. The rms Noise is calculated by the low slew rate. fin, FS, pi and t are known values, so solve for ta(jitter rms)

Just as a heads up—21000 high slew rate points, but only 1300 (for a 12bit converter) low slew rate points are being used to calculate the jitter. This takes into account the low level noise assumption described above and the reason you could increase the low slew rate points if more noise is inject, just be careful you don't get to high up on the curve where jitter is getting into the low slew rate points.

```
*/
/* for speed requirements and also to avoid math alarms(when the var_low slew
    is greater than code_error_var at certain angles, which was found to be
    at angles near the low slew rate) the num_angles variable was created
    to only look at the angles around the high slew rate point.
    we are looking at angles sin(0deg +/-num_angles + 135 degree offset)
        and     sin(180deg +/- num_angles + 135 degree offset)
*/
num_angles = 30;
    lower angle = 0;
    for(i=0; i<360; i++)
        {
        code_error_mean = 0;
        code_error_mean2 = 0;
        angle = i + 0.5;
        upper_angle= (rot) (angle*N/360);
        mid_angle = (float)(upper_angle+lower_angle)/2;
        if(mid_angle==0.5) mid_angle = 0;
        /*  here is the code where the num angles saves on test time as
            described above */
        if( (i >= 45-num_angles) && (i <= 45+num angles) ||
            (i >= 225-num_angles) && (i <= 225+num_angles))
            {
            /*  find this loop find the mean and mean squared values that are used
                to calculate the variance or code error rms squared. this is assumed
                to be equivalent to the noise + fitter at the high slew rate*/
                for (j = lower_angle; j<= upper-angle; j++)
                    {
                    code_error_mean = code_error_mean +
code_error_adjust[j];
                    code_error_mean2 = code_error_mean2 +
        code_error_adjust[j]*code_error_adjust[j];
                    }
                k = upper_angle – lower_angle +1;
                code_error_var[i] = (code_error_mean2/k) –
        (code_error_mean/k*code_error_mean/k);
            /*  subtracts out sin(135) offset - angle adjust is the actual
                angle on the sine wave. This will be used to figure out the
                relative time when calculating jitter
            */
            angle_adjust = angle + 135–0.5;
            if(angle_adjust >= 360) angle_adjust = angle_adjust –360;
            /* need to find t as if sine wave is always between 0 and 90
                degrees. so this if else sequence just sets
                    t @ 0deg to 90deg =     t @ 0deg to 90 deg
                    t @ 91deg to 180deg =   t @ 90deg to 0 deg
                    t @ 181degto 270deg=    t @ 0 deg to 90 deg
                    t @ 271deg to 360deg=   t @ 90deg to 0 deg
            */
            if( (angle adjust > 0) && (angle_adjust <=90) ) 0
                t = 1.0/( (float)(fin*N))
    ((float)N/360.0*(float)angle_adjust);
                else if( (angle_adjust > 90) && (angle adjust <= 180))
                    t =1.0/((float)(fin*N)) *
    ((float)N/360.0*(180.0–(float)angle_adjust));
                else if((angle adjust > 180) && (angle adjust <= 270) )
                    t = 1.0/((float)(fin*N)) *
    ((float)N/360.0*(180.0–(float)angle adjust));
                else if( (angle adjust >270) && (angle adjust <= 359))
                    t = 1.0/((float)(fin*N)) *
    ((float)N/360.0*((float)angle_adjust-360.0));
                else if(angle adjust ==0)
                    t =
1.0/((float)(4*fin*N))*((float)N/360.0*(float)angle adjust);
                else if(angle adjust ==360)
                    t = 1.0/((float)(4*fin*N)) *
    ((float)N/360.0*((float)angle adjust – 360.0));
            /*  calculates jitter for all angles in specified range. Notice the
                (mid_angle+3.0*(float)N/8.0) uses the angle of interest in this
                equation. Mid_angle is the variable, while 3*N/8 gives you the
                sin(135) angle offset that is the code error plot. the if loop will
                avoid math alarms - taking the sqrt of a negative number */
```

```
        if(var_low_slew < code error var[i])
            {
            jitter_angle[i] = -(asin( sin(2*M_PI*
            (mid_angle+3.0*(float)N/8.0)/(float)N) -
            sqrt(code_error_var[i]-var_low_slew) /fund) /
            (2.0*M_PI*(float)fin) - t);
            }
        else
            {
            jitter_angle[i] =0.0;
            numzeroes++;
            }
        }
        else jitter_angle[i]=0.0;
        lower_angle = upper_angle+1;
        }
    running-mean = jitter_angle[45] + jitter angle[225];
    for(i=1; i<num_angles; i++)
        {
        running_mean = running_mean + jitter_angle[45+i] + jitter_angle[45-i] +
jitter_angle[225+i] + jitter_angle[225-i];
        }
k = 4*(i-1) +2;
*jitter_mean = running_mean/k;
/* set the jitter to zero if more than 1/8 of the jitter measurements
    are zero - just a safeguard */
if(numzeroes>num_angles/2) *jitter mean =0;
```

Simulations

Simulations were performed on the IFFT/code error method to determine how to get the most repeatable jitter measurement for a given number of samples. Simulations were done in Matlab. To determine the ideal mathematical repeatability for a given set of conditions each jitter measurement was performed 150 times.

A random noise generator and a random jitter generator were also coded into Matlab to add to an ideal sine wave. This way the programmer could program known values of noise and jitter. Then after the repeatability study was ran the programmer could see how well the calculated values from the DHUS jitter measurement technique varied from the ideal value.

A random phase generator was used in Matlab to mimic the A5xx VHFCW's random phase start location. This was done, because for the IFFT/code error method to work the random starting phase location has to be calculated from the FFT. The calculated phase location will then be used to adjust the code error plot.

Other variables that the programmer had control over were the number of output bits of the A/D, input frequency, sampling frequency, number of cycles, number of samples, gain error, offset error, deterministic noise and deterministic jitter. This amount of control was included to model the A/D as close to reality as possible. For simulations these variables were not varied in an individual repeatability study, since they should be set values for any given device.

Results of Simulations

The results of the simulations ran will be presented Excel table format for ease of cross-referencing. Each simulation variable will be explained.

Simulation 1: How do noise level and jitter level variations affect the mean and standard deviation of the jitter measurement?

Jitter is found by finding the noise floor level at the low slew rate and by finding the noise floor level and noise due to jitter level at the high slew rate. Then subtracting the sum of the squares to find the jitter level. Jitter measurement repeatability should get worse as the noise floor increases.

Input conditions for 150 run repeatability study in Matlab
14 bit A/D converter
fin = 16 Mhz, cycles = 10485, number of samples = 65536,
offset error = 8 codes,
input sine wave amplitude was 50 codes from full scale to avoid clipping.

| jitter(ps rms) | noise(codes rms) | jitter rep. Study mean(ps) | jitter rep. Study std(ps) |
| --- | --- | --- | --- |
| 1 | 1 | 0.985 | 0.058 |
| 1 | 2 | 0.91 | 0.2 |
| 9 | 1 | 8.98 | 0.043 |
| 9 | 2 | 8.98 | 0.049 |
| 9 | 8 | 8.93 | 0.32 |

Summary Simulation 1:

The models show that the repeatability (standard deviation) does in fact get worse as the noise floor increases for a given jitter level. These results were confirmed in the DHUS simulation section also. All result here were taken using the num_angles variable of 23 to calculate the running-mean variable as shown in step L of the 1FFT/Code error description.

Simulation 2: Shows the effect of decreasing the captured sample size and its effects on the repeatability. Simulation 3 in the DHUS section showed the effects of increasing the sample size. Decreasing the sample size was chosen for this section due to the long Matlab simulation times for this method.

Input conditions for 150 run repeatability study in Matlab
14 bit A/D converter
fin = 16 Mhz, offset error = 8 codes
input sine wave amplitude was 50 codes from full-scale to avoid clipping

| samples | noise(codes rms) | jitter(ps rms) | jitter rep. study mean(ps) | jitter rep. study std(ps) |
|---|---|---|---|---|
| 16384 | 2 | 9 | 8.942 | 0.1 |
| 65536 | 2 | 9 | 8.98 | 0.049 |

Summary Simulation 2:

Tthis simulation agrees with the DHUS simulation #3 and the theory that the more samples used the better your repeatability will be.

Simulation 3: Shows the effects of different converter resolutions with the same test conditions on the repeatability of the jitter measurement.

Input conditions for 150 run repeatability study in Matlab
A/D converter
fin = 12 Mhz, samples = 65536, cycles = 10485
noise level = 2 codes rms (12 bits) = 8 codes rms(14bits)
jitter level = 9 ps rms
offset error = 8 codes
input sine wave amplitude was 50 codes from full-scale to avoid clipping

| bits | jitter rep. study mean(ps) | jitter rep. study mean(ps) |
|---|---|---|
| 12 | 8.901 | 0.43 |
| 14 | 8.853 | 0.59 |

Summary Simulation 3:

This result is somewhat surprising. We thought beforehand that by increasing the resolution of the converter vast improvements (4× in this example) would be seen in the fitter repeatability. This simulation shows just the opposite! It gets worse. This is different than the results seen in the DHUS method. The reason has to do with the way the low slew rate variance is calculated for the IFFT/code error method. For this method the number of points used is determined by solving this equation for delta_ls.

$$fund + fund * \cos(2*pi*delta\_ls/N) = fundamental - 1$$

Basically, this equation takes all codes between the peak code and the peak code −1 code. The peak code is found by using the voltage peak of the sine wave from the spectral test. So for a 12 bit (fin=12 Mhz) converter the number of points used for the low slew rate points is 1300. However for a 14 bit converter the number of low slew rate points is 650. Since in this example the noise floor is so dominant (8 codes rms noise for 14 bit) this effect is really noticeable. However, if the noise floor was less dominant at 14 bits this effect might not be as significant. The number of high slew rate points for this method should stay the same (20,000 points) since it is calculated by angles.

When the noise level starts to dominate the fitter the low slew rate variance becomes just as important as the high slew rate variance. To fix this you will need to increase the number of low slew rate points to determine its standard deviation (See Simulation 4). Another option would be to increase the total number of samples taken (See simulation 2), but this would increase test time noticeably.

Simulation 4: What happens to the standard deviation if more points are used in the development of the low slew rate equation (see step H of IFFI'/code error method).

/* This is accomplished by changing the following equation (which determines how many codes below full-scale that are used to determine the low slew rate mean and standard deviation.
   fund +fund *cos(2 *pi *delta_ls/N) -fundamental − 1
   to
   fund +fund *cos(2*pi*delta_ls/N) -fundamental −2 */
/* This in turn affects the equation for delta_ls
   delta_ls = Nl(2*M_PI)*acos((fund −1.0)/(fund));
   to
   delta_ls = NlP *M_PI)*acos((fund −2.0)/(fund)); */
Input conditions for 150 run repeatability study in Matlab
14 bit A/D converter
   fin = 12 Mhz, cycles = 10485, number of samples = 65536,
   offset error = 8 codes,
   input sine wave amplitude was 50 codes from full-scale to avoid clipping
   noise = 8 codes rms, jitter = 9 ps rms

| delta_ls | jitter rep. study mean(ps) | jitter rep. study std(ps) |
|---|---|---|
| N/(2'M-PI)'acos((fund-1.0/(fund)) | 8.853 | 0.59 |
| N/(2'M-PI)*acos((fund-2.0/(fund)) | 8.894 | 0.49 |
| N/(2'M-PI)'acos((fund-4.0/(fund)) | 8.925 | 0.401 |

Summary Simulation 4:

This is an interesting option. When the noise floor gets to high to make repeatable jitter measurements this method allows you to look at more low slew rate points to improve the standard deviation. This is good because you can improve repeatability without increasing the sample size and adding test time. However, one caution should be made that you may have more sensitivity to INL on your low slew rate mean and standard deviation, which could hurt your measurement. See the summary of Simulation 3 for the IFI'T/code error method for more of an explanation why the delta-Is. affects this measurement. Notice that for the last condition N/(2*M_PI)*acos((fund-4.0/(fund)) the standard deviation number is slightly better than the 12 bit standard deviation number in Simulation 3.

Simulation 5: Will the IFFT/code error recognize a deterministic fitter (described in Appendix A). Deterministic jitter is also known as Periodic Jitter.

Simulations were ran, but no simulation data will be presented, as the summary should be self-explanatory.

Summary Simulation 5:

This is a very important point. The IFFT/code error method recognizes both random and deterministic jitter. This means you do not have to remove the spurs if all you are concerned about is the Total Harmonic Distortion (THD), SNR, Signal and Noise Distortion (SND) and ENOB measurements, because the IFFT/code error method will subtract out the deterministic error. However, it is still a good idea to remove the spurs before calculate any spectral and jitter, because the Spurious Free Dynamic Range (SFDR) test will be affected by the spurs produced by the deterministic jitter.

TEST TIME

| | 65536 samples IFFT/code error JITTER (ENOB included in measurement free of charge) |
|---|---|
| A5xx Standard A5xx power port Catalyst | 1.633 sec |

Test times due not reflect device setup times. They start at the hsd pattern and end at the test statements. This test time was taken on 1/24/00. There are still some ideas on how to reduce this test time, but not as many ideas as the DHUS.

SUMMARY IFFT/Code error

Simulations show that there can be a significant amount of variability in the IFFT/Code error fitter calculations that can affect your ENOB variability depending on your test conditions and dynamic range of your device. This method has been shown to correlate well with the A5xx with the THS1265 device. This method can be sensitive to INL and sparkle codes. However, there are software coding techniques that can be employed to get around these sensitivities as discussed in the description of this test. Through simulations (see simulation 5) this method has shown that it DOES recognize deterministic jitter, which is also known as periodic jitter (see Appendix A). Simulations have shown that if your noise floor is really high that you may have to increase the number of samples in your low slew rate calculation to improve repeatability(see simulation 4).

The main advantage to this method is that fitter and ENOB are calculated from the same data sets. This intuitively should improve test repeatability since the test conditions and the data sets for the two tests are exactly the same. However, with that being said care has to be taken with filtering out sparkle codes and how INL is handled if the INL is bad. Ideally jitter on a given tester should not change that much from device to device so one recommendation for test time improvement would be to measure jitter on a certain number of devices in a lot and use that value for the rest of the lot.

What is claimed is:

1. A method of measuring jitter in a device under test comprising the steps of:

providing a coherent sample signal to the device under test; to capture data unwrapping the data from the device;

performing FFT (Fast Fourier Transform) of the unwrapped data;

removing a DC harmonic and a fundamental frequency from the FFT of the unwrapped data;

performing an inverse FFT of the FFT of the unwrapped data with the DC harmonic and fundamental frequency removed to get a code error;

adjusting the code error to a predetermined phase;

determining the variance of the code error at a low slew rate;

determining the variance of the code error at a high slew rate; and calculating the jitter on each angle from the variance of the code error determined at the high slew rate and the variance of the code error determined at the low slew rate.

2. The method of claim 1 wherein said method includes the step of removing sparkle codes before adjusting the code error.

3. The method of claim 2 including the step of averaging the jitter for all angles that the jitter is calculated.

4. The method of claim 1 including the step of averaging the jitter for all angles that the jitter is calculated.

* * * * *